US005932321A

United States Patent [19]

Eisele et al.

[11] Patent Number: 5,932,321

[45] Date of Patent: Aug. 3, 1999

[54] ELECTROSTATIC COLOR IMAGING PAPER WITH AN INSTRINSIC RELEASE DIELECTRIC LAYER

[75] Inventors: John F. Eisele, Lakeland; Valdis Mikelsons, Mendota Heights; Gaye K. Lehman, St. Paul; Paul J. Wang; Patricia J. A. Brandt, both of Woodbury, all of Minn.

[73] Assignee: Minnesota Mining and Manufacturing Company, St. Paul, Minn.

[21] Appl. No.: 08/962,202

[22] Filed: Oct. 31, 1997

Related U.S. Application Data

[63] Continuation of application No. 07/914,807, Jul. 16, 1992, Pat. No. 5,702,803.

[51] Int. Cl.[6] .......................................................... B32B 3/00

[52] U.S. Cl. .......................... 428/195; 428/447; 428/450; 430/67

[58] Field of Search .................................... 428/195, 446, 428/447, 450; 430/66, 67

[56] References Cited

U.S. PATENT DOCUMENTS

| | | | |
|---|---|---|---|
| 4,064,312 | 12/1977 | Crystal | 428/447 |
| 4,218,514 | 8/1980 | Pacansky et al. | 428/447 |
| 4,600,673 | 7/1986 | Hendrickson et al. | 430/66 |
| 4,728,571 | 3/1988 | Clemens et al. | 428/352 |
| 4,807,341 | 2/1989 | Nielsen et al. | 29/132 |
| 5,045,391 | 9/1991 | Brandt et al. | 428/336 |
| 5,702,803 | 12/1997 | Eisele et al. | 428/195 |

*Primary Examiner*—Elizabeth Evans
*Attorney, Agent, or Firm*—H. Sanders Gwin, Jr.

[57] ABSTRACT

The invention provides electrographic imaging sheets comprising a substrate carrying a layer of dielectric material which has abhesive properties suitable for the release of a multicolored toner image from the dielectric surface during image transfer, while also having good toning properties during the several development stages of a multicolor toner imaging process.

7 Claims, No Drawings

ELECTROSTATIC COLOR IMAGING PAPER WITH AN INSTRINSIC RELEASE DIELECTRIC LAYER

CROSS REFERENCES TO RELATED APPLICATIONS

This is a continuation of U.S. Ser. No. 07/914,807, filed Jul. 16, 1992 now U.S. Pat. No. 5,702,803 issued Dec. 30, 1997. Other related applications include U.S. Pat. No. 5,262,259, which is a continuation in part of U.S. Ser. No. 07/460,395, filed Jan. 3, 1990, now abandoned.

There is also relationship with U.S. Pat. No. 5,045,391, issued Sep. 3, 1991, which claims silicone-urea block polymer release layers on a dielectric layer of an imaging sheet in electrostatic printing.

BACKGROUND OF THE INVENTION

1. Field of the Invention

The invention relates to imaging sheets for making large size, full color images by means of a multicolor electrographic process using a one-pass printer followed by transfer of the image to a receptor surface. In particular the invention relates to imaging sheets comprising a dielectric layer which exhibits controlled release properties for image toners deposited on it.

2. Description of Related Art

Full color reproductions by electrophotography were disclosed by C. F. Carlson in his early patents (U.S. Pat. No. 2,297,691) but no detailed mechanisms were described. Another early patent (U.S. Pat. No. 2,752,833) by C. W. Jacob discloses a method based on a single transparent drum coated with a photoconductor around which a web of receptor paper is fed. Electrostatic images are produced on the drum and by induction on the receptor paper, by three colored line scan exposures from inside the drum. Charging stations precede And toner stations follow each of these scan positions. The final tricolor image is assembled directly on the receptor paper. In U.S. Pat. No. 4,033,688 (Agfa-Gevaert) a single photoconductive drum is exposed to three color beams disposed at different points around its circumference, each point being provided with the requisite charging and toning stations and the three color images are transferred in registration to a receptor sheet. Other similar systems are disclosed in U.S. Pat. No. 4,403,848 and U.S. Pat. No. 4,467,334. The use of a sequence of exposure/toning stations immediately following one another as opposed to multiple drum rotations as found in other methods (eg. U.S. Pat. No. 4,728,983) gives higher production rates for the color prints.

The use of electrographic processes, as opposed to the electrophotographic processes described above, is well represented in the art. In these processes the electrostatic latent image is produced directly by "spraying" charge onto an accepting dielectric surface in an imagewise manner. Styli are often used to create these charge patterns and are arranged in linear arrays across the width of the moving dielectric surface. These processes and the required apparatus are disclosed for example in U.S. Pat. No. 4,007,489, U.S. Pat. No. 4,569,584, U.S. Pat. No. 4,731,542 and U.S. Pat. No. 4,808,832. In all of these, the multicolor toner image is assembled and fixed on the accepting surface. None of these references discloses transferring the assembled image to a receptor surface.

The toners disclosed by C. F. Carlson (U.S. Pat. No. 2,297,691) were dry powders. Staughan (U.S. Pat. No. 2,899,335) and Metcalfe & Wright (U.S. Pat. No. 2,907,674) pointed out that dry toners had many limitations as far as image quality is concerned, especially when used for superimposed color images. They recommended the use of liquid toners for this purpose. These toners comprised a carrier liquid which was of high resistivity (>$10^9$ ohm.cm) and had both colorant particles dispersed in the liquid and preferably an additive intended to enhance the charge carried by the colorant particles. This basic formulation is still used in the current art.

A number of methods have been disclosed in the patent literature intended to effect liquid toner image transfer with high quality. Silicones and polymers containing silicones as mould release layers and leveling compounds are well known as additives to layers to give release properties.

In the electrophotographic field, photoconductive layers topcoated with silicone layers are disclosed in U.S. Pat. No. 3,185,777; U.S. Pat. No. 3,476,659; U.S. Pat. No. 3,607,258; U.S. Pat. No. 3,652,319; U.S. Pat. No. 3,716,360; U.S. Pat. No. 3,839,032; U.S. Pat. No. 3,847,642; U.S. Pat. No. 3,851,964; U.S. Pat. No. 3,939,085; U.S. Pat. No. 4,134,763; U.S. Pat. No. 4,216,283; and Jap. App. 81699/65.

In addition to patents dealing with separate release layers using silicone release agents, U.S. Pat. No. 3,476,659; U.S. Pat. No. 3,851,964; U.S. Pat. No. 3,935,154; and U.S. Pat. No. 4,078,927 all disclose the use of silicones as additives to the photoconductive layer itself to give release properties towards both toners and inks (electrographic printing plates). The first two of these patents disclose the admixture of silicone oils, waxes, or resins to the photoconductive material. U.S. Pat. No. 3,935,154 discloses block copolyesters containing silicone units in their chains which are useful as release and leveling agents and form compatible admixtures to organic and inorganic photoconductive materials. They are of particular interest in planographic printing materials. In U.S. Pat. No. 4,078,927 planographic printing materials are also disclosed which comprise photoconductive materials containing block copolymers of "soft segments" from a siloxane monomer and "hard segments" from non-siloxane monomers such as polystyrenes, polyvinylcarbazoles, polycarbonates, and polysulfones. These non-siloxane "hard segments" are disclosed as photoconductive under ultra-violet illumination and can be made visible light sensitive by addition of activators or spectral sensitizers. U.S. Pat. No. 4,772,526 (Sep. 20, 1988) discloses photoconductive layer assemblies for electrophotographic systems in which the top layer, either the charge transport layer or the charge generation layer, comprises a block copolymer of a fluorinated polyether and a polyester or a polycarbonate. The surface exhibits good toner release properties because of the presence of the fluorinated polyether, and also "is compatible with the desired functions of the charge generation and charge transport materials".

Dielectric layers for electrographic printing materials also require good toner transfer properties in many processes. U.S. Pat. No. 4,656,087 (Apr. 7, 1987) discloses dielectric -layers for electrographic imaging wherein particulate silica treated with short chain polysiloxane materials is added to the dielectric resin(s). Japanese unexamined patent application JP 57-171339 published on Oct. 21, 1982 discloses a dielectric layer comprising a mixture of an organic silicon polymer containing siloxane bonding as the main chain, and another resin such as acrylic, polyester, or epoxy resins, in the ratio range 1:4 to 4:1 by weight. These layers are disclosed as suitable for heat-transfer of toners, and as having "excellent thermoresistance, releasing properties, durability, flexibility, etc.".

SUMMARY OF THE INVENTION

In the practice of this invention the term "electrography" means a process of producing images by addressing an imaging surface, normally a dielectric material, with static electric charges (e.g., as from a stylus) to form a latent-image which is then developed with a suitable toner. The term is distinguished from "electrophotography" in which an electrostatic charge latent image is created by addressing a photoconductive surface with light. The term "electrostatic printing" and the like is commonly used in the literature and appears to encompass both electrography and electrophotography.

Our U.S. Pat. No. 5,262,259 filed on Apr. 18, 1990 discloses and claims an electrographic color printing process which uses a dielectric imaging sheet on which toner images are deposited and from which the resulting multicolor image is transferred to a receptor surface. The dielectric imaging sheet is characterized as having certain release properties which are carefully related to the toners, the receptor surface, and the various process parameters. It is disclosed that these release properties can be obtained either by coating the dielectric surface with certain carefully chosen release materials or by modifying the dielectric so that its own surface has the required release properties.

The present invention provides an electrographic multicolor imaging sheet coated on one of its major surfaces with a layer of dielectric material which has controlled release properties for the deposited liquid toners. Such materials are referred to as intrinsic release dielectric materials. The release properties are obtained by selecting unique silicone-containing polymers which are both release surfaces and dielectric materials or by incorporating silicone release agents into dielectric material in a way that these release agents do not leach out into the liquid developer during processing, and can be controlled to give surface energies in the range of 14 to 20 dynes/cm$^2$ while maintaining the amount of the polar component of the surface energy which is contributed to the total of the surface energy to less than 5% of the total surface energy. These surface energy levels together with Tg values for the dielectric component greater than 50° C. and preferably at least 100° C. provide good toner deposition properties with good transfer properties to a receptor surface.

In our U.S. Pat. No. 5,262,259 it was concluded that a suitable toner release surface on the dielectric imaging sheet should have controlled release properties given by incorporating small amounts of moieties such as silicones, but that these silicones should be firmly anchored to a polymer insoluble in the toner carrier liquid. Migration of inefficiently anchored silicone entities into the toner liquid interferred with image development. The presence of mobile silicones on the surface of the release layer was found to be unacceptable in that they resulted in the formation of toner images susceptible to damage during the process.

The patents described above as covering aspects of photoconductive layers with release properties all require that the photoconductive properties of carrier generation and transport be satisfied, and the polymers were chosen accordingly. The first two of these patents involve the mixing of mobile silicone materials with the photoconductor and are therefore not relevant to the conditions of the present invention. Of the last two patents, U.S. Pat. No. 3,935,154 disclosing the addition to a photoconductor of a few percent of a solvent soluble block copolyesters containing diorganosiloxy units. Our invention requires that the siloxane containing copolymer added to the dielectric, or acting itself as the dielectric, be insoluble in the liquid toner solvent so as to prevent the copolymer from leaching out into the liquid toner and interferring with development. In the final patent of this group, U.S. Pat. No. 4,078,927, the ink releasing layer of the planographic printing master comprises a copolymer of siloxane type units with non-silicon type units which have the capability of electron donor function, or electron acceptor function or both, under actinic stimulation. It would be a disadvantage for the dielectric layers of the present invention to act as photoconductors and thus be sensitive to ambient light. In fact, the receptor elements and layers of the present invention do not have any significant photoconductive properties. It is preferred that the elements contain no photoconductive layers therein.

Of the patents described above as related to dielectric materials for electrography, U.S. Pat. No. 4,656,087 uses short chain polysiloxane compounds which suffer the difficulty of solubility in the liquid toner solvent. In the Japanese patent application, JP 57-171339, the dielectric layer comprises a mixture of a polysiloxane and another resin which can be an acrylic resin. The disclosure makes it clear that the materials are used with dry toners, and that the siloxane containing polymers used are "ordinary commercially available silicone resins and silicone rubbers". Understandably, no teaching as to liquid toner solvent solubility is offered on the choice of siloxane containing polymers added to the dielectric polymers.

DETAILED DESCRIPTION OF THE INVENTION

In electrographic imaging sheets intended for use in a toner image transfer mode, surface release properties of the dielectric layer are important to the complete and accurate transfer of multicolor toner images. Dielectric layers with built-in release properties have advantages over dielectric layers with an abhesive topcoat. Apart from eliminating an extra coating procedure, any electrical effects related to the finite thickness of a separate release layer are also eliminated. Thus the image density and transfer efficiency are both improved. These intrinsic release dielectric layers can comprise one or more polymers combining release and dielectric moieties, or can comprise a mixture of a release material and a dielectric polymer or resin.

The intrinsic release dielectric layer of the present invention is between 1 and 50 micrometers in thickness. It is preferably between 3 and 40 micrometers and more preferably between 5 and 25 micrometers in thickness. Most preferably, the dielectric release layers of the present invention are between 5 and 15 micrometers in thickness. The dielectric layers of the present invention are coated onto a substrate. The substrate must be conductive or at least have one surface that is conductive. A surface may be made conductive by applying a layer to the surface, which layer is made of a conductive material. Conductive materials such as thin layers of metal, metallized polymer, metal filled polymer, conductive particle filled polymer, conductive polymer or the like may be used. Thin aluminum film or thin tin oxide film may be conveniently used as the conductive layer. The base substrate material may be any convenient material such as paper, natural fiber or synthetic fiber sheet, polymeric film (solid or porous), metallized paper or film, and other conventional materials known in the art.

Successful intrinsic release dielectric polymer formulations comprising release and dielectric moieties are later herein described in reference examples. These are preferably copolymers of silicone resin materials and acrylates such as copolymers of methylmethacrylate (MMA) with PDMS or terpolymers of MMA, polystyrene, and PDMS. Useful levels of PDMS ranged from 10% to 30% by weight of the total polymer; values in the range 15% to 30% gave transfer efficiencies above 90% but the optical density of the deposited toner tended to fall at the higher percentages. An optimum value for these polymers was in the range of 10% to 20%. However under conditions of processing involving less physical abrasion of the toned image, the silicone content can be much higher, even from 10% up to 65% or higher. The silicone-urea material disclosed in our copending application U.S. Ser. No. 510,597 and in U.S. Pat. No. 5,045,391 for use as a separate release top-layer on a dielectric layer may also be used by itself as an intrinsic release dielectric layer, without a dielectric underlayer. Control of release properties can be given by incoporating small amounts of moieties such as silicones, but these silicones must be firmly anchored to a polymer insoluble in the toner carrier liquid. As disclosed above, the presence of mobile silicones in the release surface of the dielectric layer was found to be unacceptable in that it resulted in toner images susceptible to damage during the process. Liquid toners for use with the electrographic imaging sheets of this invention may be selected from the types well known in the art. These toners comprise a stable dispersion of toner particles in an insulating carrier liquid which is typically a hydrocarbon and which typically has a resistivity in the region of $10^{13}$ ohm.cm and a dielectric constant of about 3.5. There exists a comprehensive series of suitable insulating carrier liquids (e.g. the Isopar™ series) with a range of boiling points. Mixtures of different members of such a series is often used in liquid toner formulations. The non-silicone part of the release component of the dielectric material must have a high softening point. An example of such a polymer is a silicone-urea block polymer with between 1% and 10% by weight of polydimethylsiloxane (PDMS), which is later herein described in reference examples. The polymer was prepared in isopropanol and diluted with further isopropanol for coating.

Other controlled release layer compositions may be obtained using monomers capable of forming condensation products with silicone units through their amine or hydroxy termination groups, the monomer units being polymerized either during or after the condensation. Examples of such compositions are urethane, epoxy, and acrylics in combination with silicone moieties such as PDMS. Where a polymer used in the practice of the present invention is described as a silicone, this means that at least one percent by weight of its repeating units comprises a silicone moiety.

Intrinsic release dielectric layers comprising a mixture of B) dielectric polymers or resins and A) release materials, have been successfully used in the practice of this invention and are later herein described in reference examples. Included amongst these are mixtures where B) is at least one dielectric polymer such as polystyrene, acrylate polymers (and copolymers and terpolymers, etc.) such as polymethylmethacrylate, Butvar(polyvinyl butyral), or styrene/methylmethacrylate copolymers, and A) is at least one silicone-containing block polymer. We have demonstrated that the weight percentage ratio of the PDMS to the total block polymer in A) may be in the range 10% to 50% and more, and that the ratio of B) to A) can be in the range 90:10 to 25:75. The measured surface energy values for layers of these mixtures all lay in the range 16 to 20 dynes/cm$^2$ and good imaging properties were obtained with high transfer efficiencies, many above 95%.

The release entity in either the intrinsic release dielectric polymer or the release material in a mixture may be chosen alternatively from polymers containing fluorinated moieties such as fluorinated polyethers.

Most of the dielectric resins used in this study are commercially available materials. They are listed in TABLE 1, along with the measured or published glass transition temperatures Tg(° C.).

TABLE 1

| Polymer | Tg° C.(lit.) | Tg° C(meas.) |
|---|---|---|
| A21 Methylmethacrylate (Acryloid ™ A21 by Roehm & Haas) | 105 | |
| Polymethylmethacrylate (PMMA) | | |
| Polystyrene | 100 | |
| NAS 81 Methylmethacrylate/styrene (20% solids in toluene by Richardson Polymer Corp.) | 100 | 67 |
| Butvar ™ 76 Polyvinylbutyral (Shawinigan Resins Corp.) | 44–54 | 52 |
| E 329 Styrene/ethylacrylate (dielectric resin by DeSoto, 50% solids in toluene/ethyl acetate/ethanol) | 25(calc.) | 15 |

The silicone-urea block polymers (SU) were synthesized containing various concentrations of PDMS segments (TABLE 2).

TABLE 2

| Identifier Code | Composition |
|---|---|
| 10% SU | 10% PDMS/15% Jeffamine ™ DU 700/75% DIPIP/IPDI |
| 25% SU | 25% PDMS/75% DIPIP/IPDI |
| 50% SU | 50% PDMS/50% DIPIP/IPDI |

PDMS: polydimethylsiloxane.
DIPIP/IPDI: dipiperidyl propane and isophorone diisocyanate.

The SU polymers and dielectric resins were mixed with other components of the dielectric coating (pigments, spacer particles, solvents), dispersed by ballmilling for about 16 hours and coated on conductive paper base (made by James River Graphics). A typical coating formulation is shown below:

40 g 50% SU solution (15% solids)
30 g polystyrene solution (20% solids)
3 g Translink™ 37 clay (pigment)
2 g $CaCO_3$ (spacer particle)
1 g $TiO_2$ (pigment).

This formulation is identified as "50/50 50% SU/polystyrene" where 50/50 indicates the ratio of the two polymers.

The coatings were carried out manually using #14 or #18 Meyer bars to obtain a thickness of approximately 10 micrometers.

The coatings containing polymer blends were examined under an optical microscope to obtain a qualitative assessment of the compatibility of silicone-urea with other polymers. The samples for microscopy were prepared by removing the dielectric layer and mounting it on a glass substrate. Dark field reflected light microscopy technique was used for examination. Similarly prepared samples were used for coating thickness measurements.

Polymer Compatibility and Surface Energies.

Microscopy of dielectric coatings comprising mixtures of 50% SU (silicone-urea with 50% PDMS content) with other polymers shows that it is compatible with E 329 (styrene-ethyl acrylate) up to at least a 1:1 mixing ratio and Butvar™ 76 (polyvinylbutyral) to a 3:1 ratio. Compatibility in this context means that phase separated regions may be present in the coating, but they do not cause large distortions of surface topography. Mixtures of 50% SU with polymethylmethacrylate (PMMA), styrene, and NAS 81 (methylmethacrylate-styrene copolymer) show significant incompatibility, i.e. the added pigments tend to concentrate in one polymer phase and the coatings contain ridges and deep craters. Compatibility is improved and smoother coatings are obtained if the 50% SU proportion in the mixture is reduced or the PDMS content in the silicone-urea polymer is decreased. It has been found that image quality suffers when polymer incompatibility results in significant surface distortions of the layer. The compatibility observations are summarized in TABLE 3.

TABLE 3

POLYMER COMPATIBILITY

| Components | Ratio | Comments |
|---|---|---|
| 10% SU + Butvar ™ 76 | 50/50 | compatible |
| 50% SU + Butvar ™ 76 | 50/50 | compatible |
| 50% SU + Butvar ™ 76 | 75/25 | phase sep., smooth coating |
| 10% SU + E 329 | 10/90 | compatible |
| 50% SU + E 329 | 10/90 | compatible |
| 50% SU + E 329 | 50/50 | phase sep., smooth coating |
| 25% SU + PMMA | 50/50 | phase sep., rough coating |
| 50% SU + polystyrene | 50/50 | phase sep., rough coating |
| 50% SU + NAS 81 | 10/90 | compatible |
| 50% SU + NAS 81 | 50/50 | phase sep., rough coating |

Experiments with silicone-urea/polystyrene blends suggest that compatibility can be improved by the addition of "compatibilizer" polymers. For example, addition of about 10% by weight of polystyrene-b-polydimethylsiloxane (Mw=45400) reduced the size of the phase-separated regions.

TEST PROCEDURE FOR DIELECTRIC RELEASE COATINGS

The "intrinsic release" dielectric constructions were electrostatically charged and developed using a Benson 9323 single station electrostatic printer. A black "B 51" liquid toner, produced by Hilord Chemical Corporation, was used for image development.

The electrographic performance of a dielectric construction was considered acceptable if the developed image had a reflective optical density of about 1.4 and the density was uniform over large area.

The ability of the dielectric surface to perform the release function in the image transfer step was determined by measuring the image transfer efficiency. To determine the efficiency, the reflective optical density was measured in the image and background areas of the imaged "intrinsic release" construction before and after transferring the liquid toner image to a receptor surface, and the image transfer efficiency was calculated using the formula $$\text{Transfer Efficiency } (\%) = 100 - 100 \times \{OD_r - OD_{Br}\}/\{OD - OD_B\}$$

where OD is the image optical density on the imaging sheet before transfer, $OD_r$ the residual optical density in the image area after the image has been transferred, $OD_B$ the optical density in the background area before transfer, and $OD_{BR}$ is the residual optical density in the background area after transfer.

We have found that transfer efficiency values above about 95% represent high quality transferred images. As the value falls below 95% the images first evince minor "spotting" where small areas of toner are not transferred, and then progressively larger losses in the image until at 80% the transferred image is substantially unusable for any but the most undemanding imaging purposes.

The receptor material in these image transfers was 4 mil (0.1 mm) Scotchcal™ coated with a pigmented vinylacrylic resin. Two transfer techniques were employed: heated nip roller and heated vacuum drawdown frame. In the nip roller method the air pressure in the piston pressing the rollers together was 64 lbs/sq.in, and the rotational speed of the rollers and their temperatures were set such that the interface between the receptor and the imaged "intrinsic release" dielectric was heated to 60° C.–70° C. for about 6 seconds during the image transfer process. In the vacuum drawdown technique the image donor and receptor surfaces were forced together with a pressure of one atmosphere for five minutes at a temperature of 112° C.

The following table shows the test results for various "intrinsic release" dielectric constructions in which the polymeric portion of the coating comprises a blend between a dielectric resin and an image releasing material. The Table includes optical density values (OD) for the developed image and the measured efficiency (%) for ROLLer and for HVA (vacuum drawdown) with which it is released to the receptor surface.

IMAGE TRANSFER EFFICIENCY (%)

| SAMPLE | OD | ROLL | HVA |
|---|---|---|---|
| 50/50 50% SU/NAS 81 | 1.41 | 99.7 | 97.2 |
| 75/25 50% SU/BUTVAR ™ 76 | 1.38 | 97.5 | — |
| 50/50 50% SU/BUTVAR ™ 76 | 1.56 | 84.0 | 62.4 |
| 50/50 50% SU/POLYSTYRENE | 1.39 | 98.4 | 97.3 |
| 50/50 25% SU/PMMA | 1.50 | 98.4 | 94.4 |

Illustration of interpretation of concentration values:

50% SU=silicone-urea block polymer containing 50% PDMS.

75/25=ratio of silicone-urea polymer/dielectric resin.

The data show that dielectric resins such as NAS 81, polystyrene and polymethylmethacrylate (PMMA), when mixed with a silicone-urea copolymer containing 50% silicone, can be used to produce image releasing dielectric coatings suitable for electrographic imaging. Image release is less efficient from coatings containing a blend of silicone-urea copolymer with Butvar™ 76 resin.

Surface energy measurements.

a) Sample preparation.

Release Coatings.

Films of intrinsic release dielectrics were deposited on clean glass plates (24 mm×60 mm×1 mm) by dip coating solutions (3%–5% solids) of the test materials. In some cases the coatings had to be dried at 40° C. in a low relative humidity (40%) environment to obtain clear films. When the samples were the intrinsic release dielectric coated on paper, the sample plates required for contact angle measurements using the Wilhelmy technique (L. Wilhelmy, *Ann. Physik,* 119 (1863) 177) were then prepared by bonding the coated paper to both sides of a 24 mm wide polyester film support in such a manner that after immersion only the release coated surface can come in contact with the test liquid.

b) Contact angle measurements.

A Cahn-322 Model Dynamic Contact Angle Analyzer was used to measure the advancing and receding contact angles of the wetting liquid on the surface of the Wilhelmy plate. Advancing contact angles were measured at 3–5 different regions of the surface of the Wilhelmy plate and the values were found to be reproducible within an error of less than ±1% in most cases and ±2% in a few cases. At least 4 liquids of widely different $\gamma^d$ and $\gamma^p$ were used as the wetting liquids for each test surface.

c) Calculation of surface energy from contact angle data.

From the measured advancing contact angles θ of test liquids with known $\gamma_1^d$ and $\gamma_1^p$ on the solid surface, the surface energy is calculated from the equation (H. Y. Erbil and R. A. Meric, Colloids & Surfaces, 33, (1988) 85–97, and the original references cited therein):

$$\text{Cos}\ \theta_i = -1 + 2[(\gamma_i^d \cdot \gamma_j^d)^{1/2} + (\gamma_i^p \cdot \gamma_j^p)^{1/2}]/\gamma_i$$

where i indicates liquid and j indicates solid.
and $$\gamma_i = \gamma_i^d + \gamma_i^p$$

where i=1,2, . . . n and n is the number of test liquids in a set with surface energy values published in the art covering a range of polarities, The values of the surface tension $\gamma^{total}$ and the dispersion component (i.e., the disperse energy component) and polar (energy) components of the surface tension $\gamma^d$ and $\gamma^p$ for various test liquids were taken from Kaelble, et. al (D. H. Kaelble, P. J. Dynes and L. Maus, J. Adhesion, 6, (1974), 239–258) (See Table 1). The values for ethylene glycol were measured with the Wilhelmy balance using test solids with known properties.

Surface energy measurements were made on a series of materials which were candidates for use in this invention.

We have shown that surface energy $\gamma^{total}$ of the imaging medium correlates with image release properties. Generally, if γ is below 20 ergs/cm$^2$ the liquid toner image can be transferred from the surface using heat and pressure methods. The Wilhelmy plate technique, as described above, was used to measure surface energies of dielectric coatings containing pigments, spacer particles and (a) only silicone-urea polymers, (b) only dielectric resins and (c) blends between (a) and (b). The results are summarized in TABLE 4.

TABLE 4

SURFACE ENERGIES OF DIELECTRIC COATINGS

| Sample # | Composition of coating | $\gamma^d$ ergs/cm$^2$ | $\gamma^p$ ergs/cm$^2$ | $\gamma^{total}$ ergs/cm$^2$ |
|---|---|---|---|---|
| 1 | 10% SU (no fillers) | 15.9 | .05 | 16.4 |
| 2 | 10% SU (B:P = 2:1) | 15.6 | .1 | 15.7 |
| 3 | 25% SU (B:P) = 2:1) | 21.2 | .048 | 21.2 |
| 4 | E 329 (B:P = 2.67:1) | 24.8 | 3.75 | 28.5 |
| 5 | NAS 81 | 25.4 | 3.0 | 28.4 |
| 6 | 10/90 10% SU/E 329 | 18.7 | .021 | 18.7 |
| 7 | 25/75 10% SU/E 329 | 17.5 | .016 | 17.5 |
| 8 | 10/90 50% SU/E 329 | 19.2 | .0022 | 19.2 |
| 9 | 10/90 10% SU/NAS 81 | 17.3 | .4 | 17.8 |
| 10 | 10/90 50% SU/NAS 81 | 20.2 | .0066 | 20.2 |
| 11 | 50/50 25% SU/PMMA | 17.1 | .14 | 17.2 |
| 12 | 50/50 50% SU/-Butvar ™ 76 | 17.2 | .4 | 17.6 |

As would be expected, the polar component and the total energy of a surface is significantly reduced when SU polymer is present. It will be shown, however, that low surface energy alone does not insure complete image transfer. Although the composition of sample #11 is such that phase separation occurs, the surface energy appears to be dominated by the 25% SU regions.

Electrostatic Imaging Properties.

Useful parameters for characterizing the electrographic performance of a dielectric medium are the surface potential, $V_s$, surface potential decay with time, and optical density (OD). The potentials were measured while the dielectric surface was moving between the electrostatic charge deposition and image development stations in the Benson 9322 or Synergy Colorwriter™ printers. The OD was measured in corresponding areas on the developed image. Several qualitative observations can be made, however:

1. Surface potentials for coatings of silicone urea/resin blends were generally lower than for coatings containing only the corresponding dielectric resins. Optical densities were similar and in an acceptable range, i.e. greater than 1.4 (see TABLE 5).
2. Surface potential $V_s$ decay for blends was similar or slightly faster than for coatings of dielectric resins. Some additives such as PDMS (molecular weight Mn=5000) and FC 431 fluorocarbon, caused accelerated $V_s$ decay.

TABLE 5

ELECTROSTATIC IMAGING PROPERTIES COATINGS

| Dielectric composition | av.thickness (μm) | $V_s$ | OD |
|---|---|---|---|
| NAS 81 | 21.9 | 124.7 | 1.46 |
| 10/90 50% SU/NAS 81 | 14.4 | 90.3 | 1.49 |
| 50/50 50% SU/NAS 81 | 10.4 | 76.7 | 1.39 |
| BUTVAR ™ 76 | 7.7 | 92.3 | 1.57 |
| 50/50 10% SU/BUTVAR ™ 76 | 9.2 | 77.7 | 1.44 |
| 50/50 50% SU/BUTVAR ™ 76 | 11.1 | 69.8 | 1.56 |
| 75/25 50% SU/BUTVAR ™ 76 | 9.2 | 91.8 | 1.44 |
| 6% FC 431 in BUTVAR ™ 76 | 9.0 | 24.0 | .24 |
| E 329 | 8.0 | 101.0 | 1.54 |
| 10/90 10% SU/E 329 | 13.7 | 90.0 | 1.55 |
| 10/90 50% SU/E 329 | 10.3 | 86.5 | 1.28 |
| 1% PDMS in E 329 | | 95.0 | 1.48 |
| 5% PDMS in E 329 | | 42.0 | .93 |
| 50/50 50% SU/polystyrene | 12.3 | 92.0 | 1.39 |
| 50/50 10% SU/PMMA | | 60.3 | 1.51 |
| 50/50 25% SU/PMMA | | 48.0 | 1.5 |
| 10% SU | 11.3 | 89.7 | 1.55 |
| 25% SU | 13.9 | 89.7 | 1.53 |
| 50% SU | | 81.5 | 1.53 |

The surface of such dielectric layers are advantageously rough to ensure good transfer of charge during the passage under the stylus charging bar. This roughness can be obtained by including in the layer particles sufficiently large to give surface irregularities to the layer. Particles of diameter in the range of 1 μm to 5 μm are suitable. Particle composition is chosen to give the required dielectric constant to the layer. These property requirments of the dielectric layer are well known in the art (see, for example, U.S. Pat. No. 3,920,880, and U.S. Pat. No. 4,201,701).

Image Transfer Properties.

The results of image transfer experiments are summarized in TABLE 6 which also contains Tg and surface energy $\gamma^{total}$ values. Data for blends containing the NAS 81 resin are not included in the Table because in most instances the dielectric coating transferred with the image regardless of whether nip roller or HVA transfer technique was used. Adhesion between the conductive paper base and the coating in this case is, apparently, weaker than between the coating and the image receptor surface.

TABLE 6

IMAGE TRANSFER EFFICIENCY.

| Dielectric Composition | OD | Transfer Efficiency % Roller | HVA | $T_g$(°C.) | $\gamma^{total}$ ergs/cm² |
|---|---|---|---|---|---|
| BUTVAR ™ 76 | 1.57 | 33.7 | | 52 | |
| 75/25 50% SU/BUTVAR ™ | 1.50 | 95.2 | 95.8 | 52(BUTVAR ™) | |
| 50/50 10% SU/BUTVAR ™ | 1.44 | 87.7 | 85.6 | 52(BUTVAR ™) | |
| 50/50 50% SU/BUTVAR ™ | 1.56 | 84.0 | 62.4 | 52(BUTVAR ™) | 17.6 |
| 50/50 50% SU/pSTY | 1.39 | 98.4 | 97.3 | (100(STY) | — |
| 50/50 25% SU/PMMA | 1.38 | 97.6 | 91.0 | 105(PMMA) | 17.2 |
| E 329 | 1.54 | 16.3 | fusing | 15 | 28.5 |
| 10/90 50% SU/E329 | 1.28 | 29.0 | fusing | 15(E329) | 19.2 |
| 5/95 PDMS/E329 | .93 | 38.6 | | 15(E329) | — |
| 1/99 PDMS/E329 | 1.48 | 28.4 | | 15(E329) | — |
| 1% SU | 1.48 | 100 | — | — | — |
| 10% SU | 1.55 | 99.8 | 98.4 | 134(hard segment) | 15.7 |
| 25% SU | 1.55 | 98.6 | 98.8 | — | 21.1 |
| 50% SU | 1.53 | 98.5 | 99.3 | 160(hard segment) | — |

"fusing" = dielectric surface fuses to image receptor.
Roller = heated nip roller transfer method.
HVA = heat/vacuum transfer method.

The data in TABLE 6 suggest that if the surface energy of the dielectric layer is lower than 22 ergs/cm² and Tg of the non-silicone component of the material is at least 100° C. then high transfer efficiencies are obtained. With lower Tg down to about 50° C. transfer efficiency is improved from unacceptable to good values by incorporating high amounts of silicone-urea in the coating. Inclusion of low molecular weight (Mn=5000) PDMS in E 329.resin (Tg=15° C.) resulted in coatings which not only-had poor electrostatic imaging characteristics but also failed to release the liquid toner image. Silicone-urea with a PDMS content between 1% and 50% used by itself as a dielectric coating are shown to give very good image release properties.

MATERIALS LISTING

Group A materials (POLYDIMETHYLSILOXANE)DIAMINE with number average molecular weight, $M_n$=5000

SILICONE-UREA containing 10% PDMS obtained as 15% solids solution in IPA

SILICONE-UREA containing 25% PDMS obtained as 15% solids solution in IPA/toluene (63:37 wt/wt)

SILICONE-UREA containing 50% PDMS obtained as 15% solids solution in IPA/toluene (63:37 wt/wt).

Group B materials

NAS 81

A styrenemethylmethacrylate copolymer purchased from Richardson Polymer Corp. and made into a 25% solids solution in toluene.

BUTVAR™ B-76

Polyvinyl butyral manufactured by Monsanto Co. and made into a 10% solids solution in toluene.

POLYSTYRENE

Made into a 20% solids solution in toluene

POLYMETHYLMETHACRYLATE

Made into a 30% solids solution in ethyl acetate/toluene

EXAMPLES

Reference Examples

The following Examples 1–9 of block copolymers show how the silicone-urea release polymers may be prepared for use in the present invention. An enabling description of these polymers is also provided.

The general synthetic scheme of the release polymers is:

| | | | |
|---|---|---|---|
| | $-[-(\text{silicone})_a-$ | $(\text{hard segment})_b-$ | $(\text{soft segment})_c-]_n—$ |
| | 5% | 75% | 20% |
| or | 10% | 75% | 15% |
| | Silicone | DIPIP/IPDI | Jeffamine ™ |

where silicone is PDMS, DIPIP is dipiperidyl propane, IPDI is isophorone diisocyanate, and Jeffamine™ is a polypropyleneoxide with diamine terminal groups.

The amount of hard segment is very important in this use; results have shown there must be no less than 75% of hard segment when there is a non-silicone soft segment. The Tg results appear to be the most direct indication for the 75% minimum.

It has been demonstrated that a good image is achieved with less than 75% Hard Segment, but only when no soft segment is present and the silicone (PDMS) proportion is higher, such as 30% to 50%. This is illustrated by the samples listed in TABLE 7 wherein all the samples provided a good image except the sample with "0" silicone (PDMS).

TABLE 7

| % PDMS 5,000 Mn | % Jeffamine ™ Du-700(800 Mn) | % Hard Segment DIPIP/IPDI | Tg° C. |
|---|---|---|---|
| 0 | 25 | 75 | |
| 5 | 20 | 75 | 101,103,130 |
| 10 | 15 | 75 | 103,108,134 |
| 15 | 10 | 75 | −124,94,150 |
| 20 | 5 | 75 | |
| 50 | 0 | 50 | −128,160 |

Tg values were obtained by differential scanning calorimetry.

The solvent was isopropanol.

Silicone=(PDMS) polydimethylsiloxane

Hard Segment=(DIPIP) Dipiperidyl propane /IPDI (Isophorone diisocyanate)

Soft Segment=(Jeffamine™) DU-700 with structure as follows,

FORMULA I

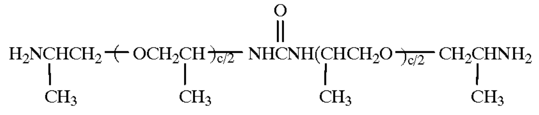

where c=11.2.

Other segments with PDMS will function as release material, but have proven to produce fuzzy images, such as:

Hard Segments=(MPMD) methyl pentane methylene diamine/IPDI or (BISAPIP) bisaminopropylpiperizine/IPDI Soft Segment=(PPO) polypropylene oxide The preferred organopolysiloxane-polyurea block polymers comprise a repeating unit of the formula:

FORMULA II

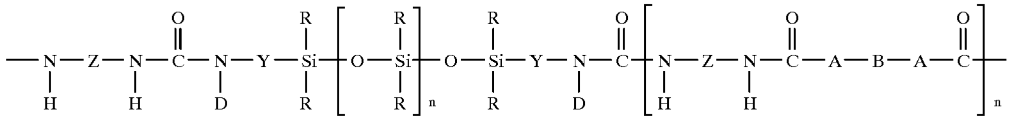

where:

Z is a divalent radical selected from the group consisting of phenylene, alkylene, aralkylene and cycloalkylene;

Y is an alkylene radical of 1 to 10 carbon atoms;

at least 50% of all R groups are methyl with the balance of the 100% of all R radicals being selected from the group consisting of a monovalent alkyl radical having 1 or from 2 to 12 carbon atoms, a vinyl radical, a phenyl radical, and a substituted phenyl radical;

D is selected from the group consisting of hydrogen, and an alkyl group of 1 to 10 carbon atoms;

B is selected from the group consisting of alkylene, aralkylene, cycloalkylene, azaalkylene, cycloazaalkylene, phenylene, polyalkylene oxides, polyethylene adipate, polycaprolactone, polybutadiene, and mixtures thereof, and a group or radical completing a ring structure including A to form a heterocycle;

A is selected from the group consisting of

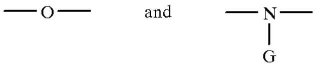

where G is selected from the group consisting of hydrogen, an alkyl group of 1 to 10 carbon atoms, phenyl, and a group or radical which completes a ring structure including B to form a heterocycle;

n is a number which is 10 (preferably 70) or larger, and m is a number which can be zero to about 25.

In the preferred block copolymer Z is selected from the group consisting of hexamethylene, methylene bis-(phenylene), isophorone, tetramethylene, cyclohexylene, and methylene dicyclohexylene and R is methyl.

The organopolysiloxane-polyurea block polymer useful in the present invention must be organic non-aqueous solvent-compatible. Water-compatible polymers containing ionic groups in the polymer chain and are not satisfactory.

The block polymers useful in the invention may be prepared by polymerizing the appropriate components under reactive conditions in an inert atmosphere.

The components comprise:

1. a diamine having a number average molecular weight (Mn) of at least 500 and a molecular structure represented as follows:

FORMULA III

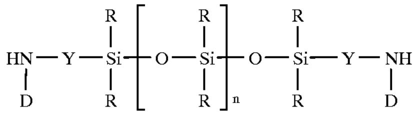

where R, Y, D and n are as defined in Formula II;

2. at least one diisocyanate having a molecular structure represented as follows:

OCN—Z—NCO FORMULA IV.

where Z is as defined in Formula II 3. up to 95% weight percent diamine or dihydroxy chain extender having a molecular structure represented as follows:

H—A—B—A—H FORMULA V.

where A and B are defined above.

The combined molar ratio of silicone diamine, diamine and/or dihydroxy chain extender to diisocyanate in the reaction is that suitable for the formation of a block polymer with desired properties. Preferably the ratio is maintained in the range of about 1:0.95 to 1:1.05.

PREPARATION OF BLOCK POLYMERS

Specifically solvent-compatible block polymers useful in the invention may be prepared by mixing the organopolysiloxane diamine, diamine and/or dihydroxy chain extender, if used, and diisocyanate under reactive conditions, to produce the block polymer with hard and soft segments respectively derived from the diisocyanate and organopolysiloxane diamine. The reaction is typically carried out in a reaction solvent.

Block Polymer Example 1

To a solution of 0.38 g of 5000 number average molecular weight ($M_n$) polydimethylsiloxane (PDMS) diamine, 1.50 g of 800 number average molecular weight ($M_n$) Jeffamine™ (Du-700) and 2.52 g of Dipiperidyl propane (DIPIP) in 242.50 gm of isopropyl alcohol (IPA)at 25° C. was added 3.10 g of isophorone diisocyanate (IPDI) slowly over a 5 minute period. The viscosity rose rapidly toward the end of the addition and the viscous yet clear reaction was stirred for an additional 15 min. This provided a 3 percent by weight solution of the block polymer in IPA. The block polymer had 5 percent by weight PDMS soft segment and 75 percent by weight DIPIP/IPDI hard segments and 20 percent by weight Jeffamine™ soft segment.

Block Polymer Example 2

To a solution of 1.13 g of 5000 number average molecular weight ($M_n$) polydimethylsiloxane (PDMS) diamine, 1.50 g of 800 number average molecular weight ($M_n$) Jeffamine™ (Du-700) and 2.52 g of Dipiperidyl propane (DIPIP) in 242.5 g of isopropyl alcohol (IPA)at 25° C. was added 3.02 g of isophorone diisocyanate (IPDI) slowly over a 5 minute period. The viscosity rose rapidly toward the end of the addition and the viscous yet clear reaction was stirred for anadditional 15 min. This provided a 3 percent by weight solution of the block polymer in IPA. The blockpolymer had 15 percent by weight PDMS soft segment and 75 percent by weight DIPIP/IPDI hard segments and 10 percent by weight Jeffamine™ soft segment.

Block Polymer Example 3

To a solution of 1.50 g of 5000 number average molecular weight ($M_n$) polydimethylsiloxane (PDMS) diamine, 0.38 g of 800 number average molecular weight ($M_n$) Jeffamine™ (Du-700) and 2.65 g of Dipiperidyl propane (DIPIP) in 242.5 g of isopropyl alcohol (IPA)at 25° C. was added 2.97 g of isophorone diisocyanate (IPDI) slowly over a 5 minute period. The viscosity rose rapidly toward the end of the addition and the viscous yet clear reaction was stirred for an additional 15 min. This provided a 3 percent by weight solution of the block polymer in IPA. The block polymer had 20 percent by weight PDMS soft segment and 75 percent by weight DIPIP/IPDI hard segments and 5 percent by weight Jeffamine™ soft segment.

Block Polymer Example 4

To a solution of 3.75 gm of 5000 number average molecular weight ($M_n$) polydimethylsiloxane (PDMS) diamine, 0 g of 800 number average molecular weight ($M_n$) Jeffamine™ (Du-700) and 1.74 g of Dipiperidyl propane (DIPIP) in 242.5 g of isopropyl alcohol (IPA) at 25° C. was added 2.01 g of isophorone diisocyanate (IPDI) slowly over a 5 minute period. The viscosity rose rapidly toward the end of the addition and the viscous yet clear reaction was stirred for an additional 15 min. This provided a 3 percent by weight solution of the block polymer in IPA. The block polymer had 50 percent by weight PDMS soft segment and 50 percent by weight DIPIP/IPDI hard segments and 0 percent by weight Jeffamine™ soft segment.

Block Polymer Example 5

To a solution of 65 g of 5000 number average molecular weight ($M_n$) polydimethylsiloxane (PDMS) diamine and 15.2 g of bisaminopropylpiperazine (bisAPIP) in 530 ml of isopropyl alcohol (IPA) at 25° C., was added 19.8 g of isophorone diisocyanate (IPDI) slowly over a 5 minute period. The exothermic reaction was controlled by means of an ice water bath to maintain the temperature at 15° C. to 25° C. during the addition. The viscosity rose rapidly toward the end of the addition and the viscous yet clear reaction was stirred for an additional 1 hour. This provided a 20 percent by weight solution of the block polymer in IPA. The block polymer had 65 percent by weight PDMS soft segments and 35 percent by weight bisAPIP/IPDI hard segments.

Block Polymer Example 6

A 250 ml. three neck flask was charged with 5 g of 5000 ($M_n$) PDMS diamine, 1.29 g of bisAPIP, 0.56 g of methylpentamethylene diamine (MPMD) and 40 g of isopropyl alcohol. The resulting solution was cooled to 20° C. with an ice bath while 2.76 g of IPDI was added. This provided the silicone polyurea as a very viscous yet clear solution in IPA. The block polymer had 52 weight percent PDMS soft segments and 48 weight percent hard segments (35 weight percent bisAPIP/IPDI and 13 weight percent MPMD).

Block Polymer Example 7

To a solution of 15.00 gm of 5000 number average molecular weight polydimethylsiloxane (PDMS) diamine, 22.50 gm of 800 number average molecular weight polypropylene oxide (PPO) with terminal diamine groups and 51.33 gm of dipiperidyl propane (DIPIP) in 1000 gms of isopropyl alcohol (IPA) at 25° C., was added 61.17 gm of isophorone diisocyanate (IPDI) slowly over a 5 minute period. The viscosity rose rapidly toward the end of the addition and the viscous yet clear reaction was stirred for an additional 30 minutes. This provided a 15 percent by weight solution of the block polymer in IPA. The block polymer had 10% by weight PDMS, 75% by weight DIPIP/IPDI, and 15% by weight PPO.

Block Polymer Example 8

To a solution of 45.00 gm of 5000 number average molecular weight polydimethylsiloxane (PDMS) diamine and 20.90 gm of dipiperidyl propane (DIPIP) in 318.75 gm of isopropyl alcohol (IPA) and 191.25 gm toluene at 25° C. was added 24.10 gm isophorone diisocyanate (IPDI) slowly over a 5 minute period. The viscosity rose rapidly toward the end of the addition and the viscous, clear reaction solution was stirred for an additional 30 minutes. This provided a 15% solids by weight solution of the block polymer in 37:63 toluene:IPA. The block polymer had 50% by weight PDMS and 50% by weight DIPIP/IPDI.

Block Polymer Example 9

To a solution of 22.50 gm of 5000 number average molecular weight polydimethylsiloxane (PDMS) diamine and 32.33 gm of dipiperidyl propane (DIPIP) in 318.75 gm of isopropyl alcohol (IPA) and 191.25 gm toluene at 25° C. was added 35.17 gm isophorone diisocyanate (IPDI) slowly over a 5 minute period. This viscosity rose rapidly toward the end of the addition and the viscous, clear reaction solution was stirred for an additional 30 minutes. This provided a 15% solids by weight solution of the block polymer in 37:63 toluene:IPA. The block polymer had 25% by weight PDMS and 75% by weight DIPIP/IPDI.

All syntheses in Examples 1–9 were run under nitrogen.

DIELECTRIC LAYER EXAMPLES

Preparation of copolymers and terpolymers of vinyl monomers with siloxane macromonomers is described in U.S. Pat. No. 4,728,571. Using that preparation and selecting methyl methacrylate (MMA) or a mixture of MMA and styrene as the vinyl monomer and further selecting polydimethylsiloxane as the siloxane macromonomer provides a route to the polymers used in this invention for intrinsic release dielectric layers. The following Examples 10 and 11 relate to polymeric materials for use in self releasing dielectric layers in the practice of the present invention.

Dielectric Layer Example 10

The dielectric layers were made by coating solutions containing the copolymer or terpolymer onto a paper substrate. Coating solutions were made from the polymer solutions according to the following formula in which percentages are weight percent:

Polymer Solution 50% (30% solids in 2:1 ethyl acetate/toluene)

Clay, Translink™ 37 3.75%

Calcium Carbonte 2.50%

Titanium Dioxide 1.25%

Tolene 50%

These solutions were ballmilled for 4 hours and coated on "conductivized" paper base from James River Graphics, using a #14 Meyer rod giving a wet thickness of 30.5 micrometers. After drying, the coatings were conditioned at 50% RH and 70° F. (21° C.) for 12 hours before use in imaging. Toner images were then produced on the material using a Benson electrostatic printer, and were then tranferred ot a receptor using the nip roller laminator. Results are given in Table 8.

TABLE 8

IMAGING RESULTS

| Polymer Composition | OD | % Transfer Efficiency |
|---|---|---|
| MMA/STY/PDMS 67.5:22.5:10 | 1.46 | 96.4 |
| MMA/STY/PDMS 45:45:10 | 1.45 | 98.5 |
| MMA/STY/PDMS 42.5:42.5:15 | 1.34 | 100 |
| MMA/PDMS 90:10 | 1.44 | 88.2 |
| MMA/PDMS 80:20 | 1.42 | 93.3 |
| MMA/PDMS 70:30 | 1.22 | 95.6 |
| MMA | 1.41 | 61.7 |

Dielectric Layer Example 11

Using silicone-urea block polymers containing 10% and 25% by weight of PDMS (described in Block. Polymer Examples 7 and 9 above) in place of the ter- and copolymers in Dielectric Layer Example 10 above to the following formula.

Polymer solution (15% solids) 93%

Clay, Translink ™37 3.5%

Calcium Carbonate 2.3%

Titanium Dioxide 1.2%

Coatings were made and conditioned in a similar manner to those in that example. Good toner image deposition was obtained and transfer efficiency by roller or HVA was above 98% for each coating.

The following dielectric layer Examples 12 are directed to the use of mixtures of dielectric materials and release materials.

Dielectric Layer Example 12

Mixtures of a dielectric polymer solution from group B with a silicone-urea solution from group A (see Materials Listing) were made in the ratios indicated in Table 9 below. To these mixtures, the following solids were added in which percentages are by weight.

93% mixed polymer solution 3.5% clay, Translink™ 37

2.3% calcium carbonate 1.2% titanium dioxide

These solutions were ballmilled for 16 hours and coated on "conductivized" paper base from James River Graphics, using a #14 Meyer rod. After drying, the coatings were conditioned at 50% RH and 19° C. for 4 hours before testing.

TABLE 9

IMAGING RESULTS ON MIXTURES.

| Sample | Volt | OD | %trnfr |
|---|---|---|---|
| 10:90 10% SU/NAS 81 | 43.2 | 1.44 | 100.0 |
| 50:50 50% SU/NAS 81 | 76.7 | 1.39 | 97.3 |
| 75:25 50% SU/BUTVAR ™ 76 | 86.3 | 1.38 | >65 |
| 50:50 50% SU/BUTVAR ™ 76 | 60.3 | 1.56 | 62.4 |
| 50:50 50% SU/Polystyrene | 92.0 | 1.39 | 97.3 |
| 50: 25% SU/PMMA | 48.0 | 1.50 | 94.4 |

What is claimed is:

1. An electrographic imaging sheet consisting essentially of:

a conductive substrate; and a layer of dielectric material on at least one surface of said substrate, wherein the layer has dried liquid toner developer release properties, said dielectric material comprising a material selected from the group consisting of silicone-urea block polymers containing from 1% to 65% by weight of polydimethylsiloxane, urethane-silicone copolymers, epoxy-silicone copolymers, and acrylic-silicone copolymers, said dielectric material being substantially insoluble in a liquid toner developer comprising a hydrocarbon carrier liquid.

2. The electrographic imaging sheet of claim 1, wherein said dielectric material comprises polymeric materials selected from the group consisting of terpolymers of polydimethylsiloxane, methylmethacrylate, and polystyrene, and copolymers of polydimethylsiloxane and methylmethacrylate, and wherein the polydimethylsiloxane constitutes between 10% and 30% of total polymer weight of the dielectric material.

3. An electrographic imaging system comprising:

(a) an imaging sheet consisting essentially of:

(i) a conductive substrate; and, (ii) a layer of dielectric material on at least one surface of said substrate, said layer of dielectric material comprising at least one polymer comprising a material selected from the group consisting of silicone-urea block polymers containing from 1% to 65% by weight of polydimethylsiloxane, urethane-silicone copolymers, epoxy-silicone copolymers, and acrylic-silicone copolymers, and having an exposed surface with dried liquid toner developer release properties; and (b) a liquid toner developer comprising a hydrocarbon carrier liquid, wherein said dielectric material is substantially insoluble in said hydrocarbon carrier liquid.

4. The electrographic imaging system of claim 3, wherein said dielectric material comprises polymeric materials selected from the group consisting of terpolymers of polydimethylsiloxane, methylmethacrylate, and polystyrene, and copolymers of polydimethylsiloxane and methylmethacrylate.

5. The electrographic imaging system of claim 3, wherein the conductive substrate is selected from the group consisting of metallized polymers, metal-filled polymers, conductive particle-filled polymers and conductive polymers.

6. An electrographic imaging sheet consisting essentially of:

a conductive substrate; and a layer of dielectric material on at least one surface of said substrate, wherein the layer has dried liquid toner developer release properties, said dielectric material comprises a mixture of components A and B, said component B comprising compounds selected from the group consisting of dielectric polymers and resins, and said component A comprising at least one silicone-containing block polymer, wherein components B and A are present in a weight ratio in the range 90:10 to 25:75, respectively, and wherein said dielectric material is substantially insoluble in a liquid toner developer comprising a hydrocarbon carrier liquid.

7. The electrographic imaging sheet of claim 6, wherein said component A is selected from the group consisting of polydimethylsiloxane, silicone-urea block polymers Containing from 1% to 65% by weight of polydimethylsiloxane, urethane-silicone copolymers, epoxy-silicone copolymers, and acrylic-silicone copolymers.

* * * * *